United States Patent [19]
Russ

[11] Patent Number: 5,918,836
[45] Date of Patent: Jul. 6, 1999

[54] AIRCRAFT SPOILER BLOW-DOWN MECHANISM

[75] Inventor: David E. Russ, Rockford, Ill.

[73] Assignee: Sundstrand Corporation, Rockford, Ill.

[21] Appl. No.: 08/823,852

[22] Filed: Mar. 25, 1997

[51] Int. Cl.$^6$ .............................. B64C 3/58; B64C 13/50; F16H 27/02
[52] U.S. Cl. ...................... 244/213; 244/228; 244/75 R; 74/89.15
[58] Field of Search ..................................... 244/213, 228, 244/231, 75 R; 188/823, 82.7, 82.77; 74/89.15, 424.8 R, 411.5; 192/223

[56] References Cited

U.S. PATENT DOCUMENTS

| | | |
|---|---|---|
| 2,653,691 | 9/1953 | Weiland . |
| 2,747,709 | 5/1956 | Bennett . |
| 2,873,848 | 2/1959 | Steinmetz . |
| 3,017,963 | 1/1962 | Landschulze . |
| 4,410,072 | 10/1983 | Dickinson et al. . |
| 4,575,027 | 3/1986 | Cronin ................ 244/213 X |
| 4,628,752 | 12/1986 | Paxton et al. .......... 74/411.5 |
| 4,697,672 | 10/1987 | Linton . |
| 4,705,144 | 11/1987 | Yabe et al. . |
| 4,745,815 | 5/1988 | Klopfenstein ....... 244/228 X |
| 4,762,205 | 8/1988 | Ortman .............. 244/75 R X |
| 4,834,225 | 5/1989 | Klopfenstein et al. ....... 192/223 |
| 4,858,491 | 8/1989 | Shube .................. 74/89.15 X |
| 4,876,906 | 10/1989 | Jones ................. 244/75 R X |
| 4,991,800 | 2/1991 | Schwarz ............. 244/75 R X |
| 5,582,390 | 12/1996 | Russ .................... 244/75 R |

FOREIGN PATENT DOCUMENTS

| | | |
|---|---|---|
| 4413054 | 4/1994 | Germany . |
| 612462 | 5/1946 | United Kingdom . |

*Primary Examiner*—Charles T. Jordan
*Assistant Examiner*—Theresa M. Wesson
*Attorney, Agent, or Firm*—Wood, Phillips, VanSanten, Clark & Mortimer

[57] ABSTRACT

An electrical mechanical blow-down mechanism for use with an aircraft spoiler avoids possible damage due to high inertial loading when a power failure occurs as the spoiler (10) is moving toward or is at an extended position by means of a structure including a ball screw mechanism (18) adapted to be connected to the spoiler (10) and including an input gear (34) adapted for rotation about an axis (36). The mechanism is ultimately driven by an electrical motor (20) having a rotary output (22) with at least one gear (26, 28) interconnecting the input gear (34) and the rotary output (22). A pawl (36) is mounted for movement between positions engaged with and disengaged from the input gear (34) and a spring (78) is utilized to normally bias the pawl (36) toward the engaged position. A solenoid (50) is operable to move the pawl (36) against the spring (78) toward the disengaged position and a motion sensor (90) is associated with the input gear 34 to determine the direction of rotation thereof. A latch (42, 106) is provided for holding the pawl (36) in the disengaged position for one direction of movement of the input gear (34) and releasing the pawl (36) for the other direction of rotation of the input gear (34). Motion sensor (90) controls movement of latch (42, 106) to prevent pawl (36) engagement after a power failure until such engagement will not damage the spoiler actuator.

14 Claims, 3 Drawing Sheets

AIRCRAFT SPOILER BLOW-DOWN MECHANISM

FIELD OF INVENTION

This invention relates to a blow-down mechanism for use with an aircraft control surface, such as a spoiler, that allows the control surface to return to an aerodynamically neutral position in the event of a power failure in its actuation system.

BACKGROUND OF THE INVENTION

Complex aircraft typically have one or more spoiler surfaces which are moved by a spoiler actuator. The spoilers, like any other aircraft control surface, are utilized to alter the aerodynamic configuration of the aircraft for various control purposes, usually by interfering with airflow to increase drag and/or decrease lift. As a consequence, an extended spoiler will have a marked effect on a flight characteristic of any given aircraft and will reduce the control options available to the pilot flying the aircraft.

Because of this fact, as a safety factor, in the event there is a power interruption to the actuating system for the spoiler, the spoiler must be able to be blown down by the airstream passing over it to a neutral aerodynamic position where it will not appreciably affect drag or lift and thus interfere with subsequent flight maneuvers. Thus, conventional spoiler actuation systems employ a hydraulic cylinder to extend the spoiler together with a valve which opens after a power failure to release the trapped column of hydraulic fluid that would otherwise keep the spoiler extended to allow the airstream to blow the spoiler back to an aerodynamically neutral position.

It is also highly desirable that the spoiler be held against further extension once it has been blown back to neutral aerodynamic position so that it cannot subsequently interfere with flight maneuvers by detracting from favorable flight characteristics.

State of the art design techniques for modern aircraft favor removal of hydraulic power inside the wings of an aircraft and replacing it with electromechanical actuation systems. Thus, a motor and a ball screw replace each hydraulic cylinder so that electrical energy to the motor can drive the spoilers through the ball screw. Of course, such a system still requires some sort of means to allow the spoiler to blow down to an aerodynamically neutral position and to hold it against subsequent extension.

One solution has been to use a ratchet and pawl mechanism. A solenoid holds the pawl out of engagement with the ratchet during normal operation. If a power interrupt occurs, the solenoid also loses power and releases the pawl to move into engagement with the ratchet. This technique works satisfactorily in a situation where the actuator happens to be retracting the spoiler at the time that power loss occurs. However, if the actuator is extending the spoiler, the pawl could engage the ratchet, which typically will be rotating, with a sudden and large impact load. This raises the possibility that the ratchet or the pawl could be severely damaged or even destroyed. Thus, there is a real need for a provision of a means to delay ratchet-pawl engagement in such a system until such time as the inertial impact between the two can be minimized. The present invention is directed to meeting this need.

SUMMARY OF THE INVENTION

It is the principal object of the invention to provide a new and improved blow-down mechanism for use with an aircraft control surface, such as a spoiler. More specifically, it is an object of the invention to provide such a mechanism that includes a ratchet and pawl and which effects ratchet-pawl engagement in such a way as to minimize or eliminate inertial impacts of any significance.

An exemplary embodiment of the invention achieves the foregoing object in a structure including a drive mechanism adapted to be connected to an aircraft control surface and which includes an input adapted for rotation about an axis. An electrical motor having a rotary output is provided and is connected to the input. A toothed element is mounted for rotation with the input and a pawl is mounted for movement between positions engaged with and disengaged from the toothed element. An electrical actuator is operable to move the pawl toward the disengaged position and a motion sensor is associated with the input for determining the direction of rotation thereof. A latch is included that is responsive to the motion sensor for holding the pawl in the disengaged position for one direction of rotation of the input and for releasing the pawl for the other direction of rotation of the input.

As a consequence, in the event of a power failure, the airstream will blow-down a spoiler or other aircraft control surface connected to the blow-down mechanism to an aerodynamically neutral position. During this time, the pawl will be disengaged from the ratchet in terms of preventing ratchet movement. When the neutral position is obtained, the ratchet will be engaged by the pawl to be held in place and to prevent any reversal of ratchet movement that would correspond to a further extension of the spoiler.

In a preferred embodiment, the motion sensor is movable and frictionally engages the input. Preferably, the motion sensor includes a leg adjacent to input and a friction pad carried by the leg and in engagement with the input. In a highly preferred embodiment, the motion sensor is a caliper-like structure having two legs that straddle the input and a friction pad is mounted on one of the legs and biased by a spring towards the other of the legs.

In a highly preferred embodiment, the input is an input gear with the gear teeth defining the toothed element.

In one embodiment of the invention, the latch includes a latch pin extending between the legs of the caliper-like structure.

In a highly preferred embodiment, the electrical actuator includes a solenoid having an armature connected to the pawl.

Other objects and advantages will become apparent from the following specification taken in connection with the accompanying drawings.

DESCRIPTION OF THE PREFERRED EMBODIMENT

Figure 1:
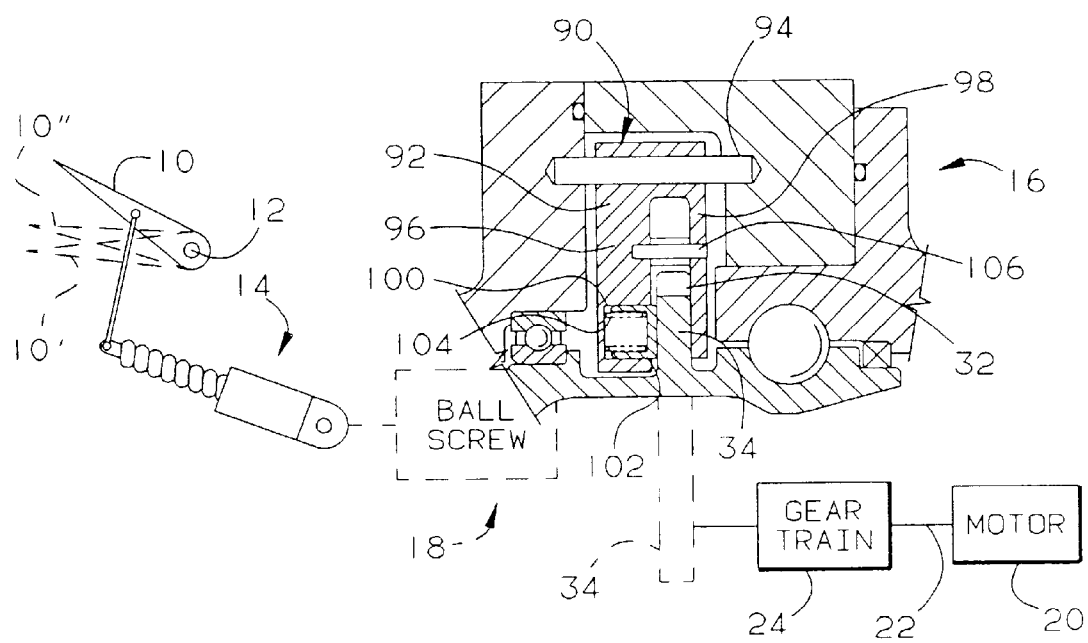
FIG. 1 is an enlarged, fragmentary, sectional view of a ratchet, pawl and caliper-like structure forming part of a blow-down mechanism made according to the invention.

An exemplary embodiment of a blow-down mechanism for use with an aircraft control surface and made according to the invention is illustrated in the drawings. While the following description makes reference to the control surface as an aircraft spoiler, those skilled in the art will recognize that the invention is not so limited, but may be used with efficacy in connection with other aircraft control surfaces as well. Accordingly, no limitation to a spoiler is intended except insofar as expressly stated in the claims.

Figure 2:
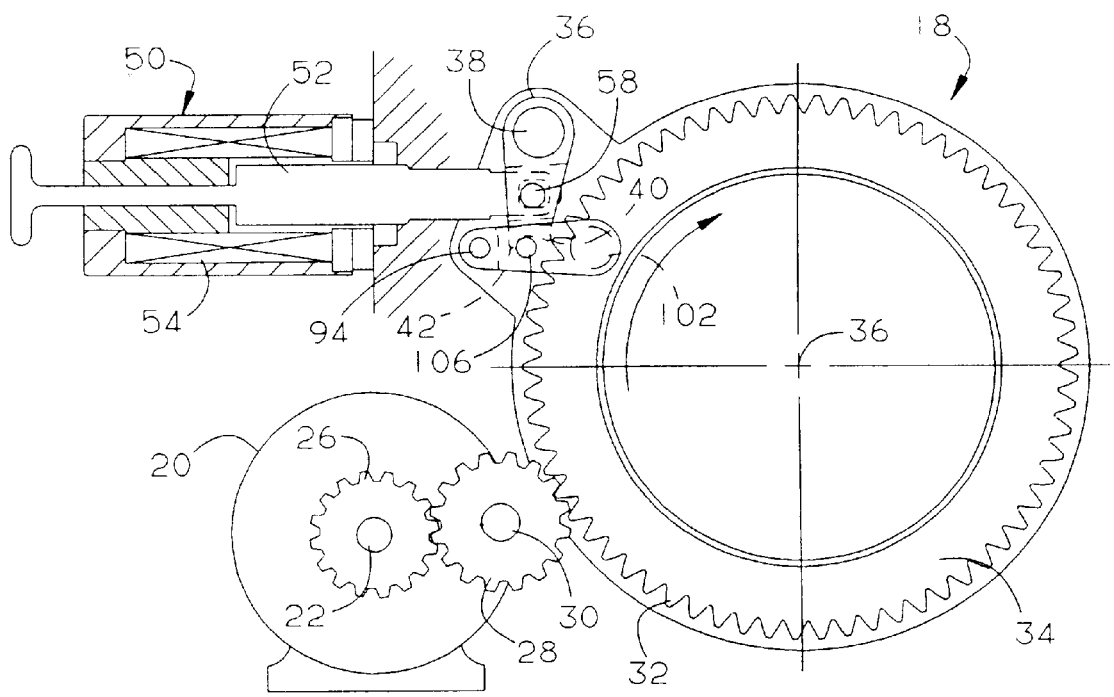
FIG. 2 is a partial, sectional view showing the configuration of the components in normal operation with electric power applied.

Referring now to FIGS. 1 and 2, an aircraft control surface in the form of a spoiler, generally designated 10 is illustrated in FIG. 1. The same is mounted on a hinge pin 12 for movement between the solid line position illustrated in FIG. 1 which is an extended position and a retracted position shown in dotted lines and designated 10'. Those skilled in the art will also recognize that the spoiler may assume an aerodynamically neutral position that will be generally closer to the retracted position than to the extended position, but not coextensive with either. Such an aerodynamically neutral position is illustrated in FIG. 1 in dotted lines and is designated 10".

Any suitable linkage, generally designated 14, may be utilized to connect to spoiler 10 to its actuating system, generally designated 16. As contemplated herein, the linkage 14 connects to the output of a conventional ball screw mechanism, generally designated 18. As is well known, the ball screw mechanism 18 will typically convert rotary motion to reciprocating motion and thereby provide a means for moving the spoiler 10 between the solid line and the various dotted line positions illustrated in FIG. 1.

The ball screw mechanism 18 includes a rotary input from an electrical motor 20 having a rotary output shaft 22. The rotary output shaft is connected to a gear train 24 as shown in FIG. 1 which in turn is connected to the input element of the ball screw mechanism 18. As illustrated in FIG. 2, the gear train includes a gear 26 mounted on the output shaft 22 of the motor 20 which in turn is meshed with an idler gear 28 on a shaft 30. Of course, additional gears may be, and typically are, employed in the construction of the gear train 24.

The gear 28 is in mesh with gear teeth 32 about the periphery of a bull gear of 34 which is rotatable about an axis 36 and acts as the input element to the ball screw mechanism 18. Typically, the motor 20 will be bidirectional with a result that the bull gear 34 may be moved clockwise or counterclockwise, depending upon the direction of operation of the motor 20. For the particular orientation of the components illustrated herein, clockwise movement of the bull gear 34 corresponds to an extension of the spoiler 10 towards its extended position whereas counterclockwise movement corresponds to movement of the spoiler 10 towards its retracted position.

The mechanism includes a housing which is fragmentarily shown in the drawings. Within the housing is a pawl 36 mounted on a pivot pin 38. The pawl 36 includes a tooth 40 which may engage with the teeth 32 on the bull gear of 34 to prevent movement of the same in the clockwise direction. The pawl 36, adjacent to tooth 40, also includes a latch tooth 42 whereby the pawl 36 can be latched out of engagement with the bull gear 34.

Figure 3:
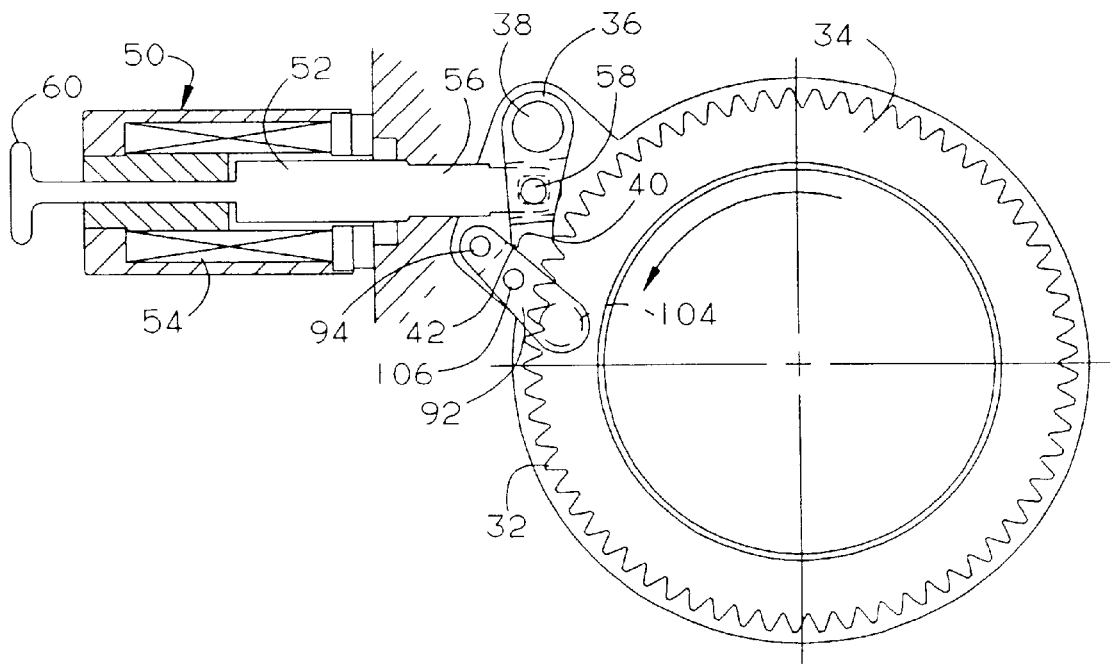
FIG. 3 is a view similar to FIG. 2 but illustrating the components in a configuration that they occupy after a power interruption.
Figure 4:
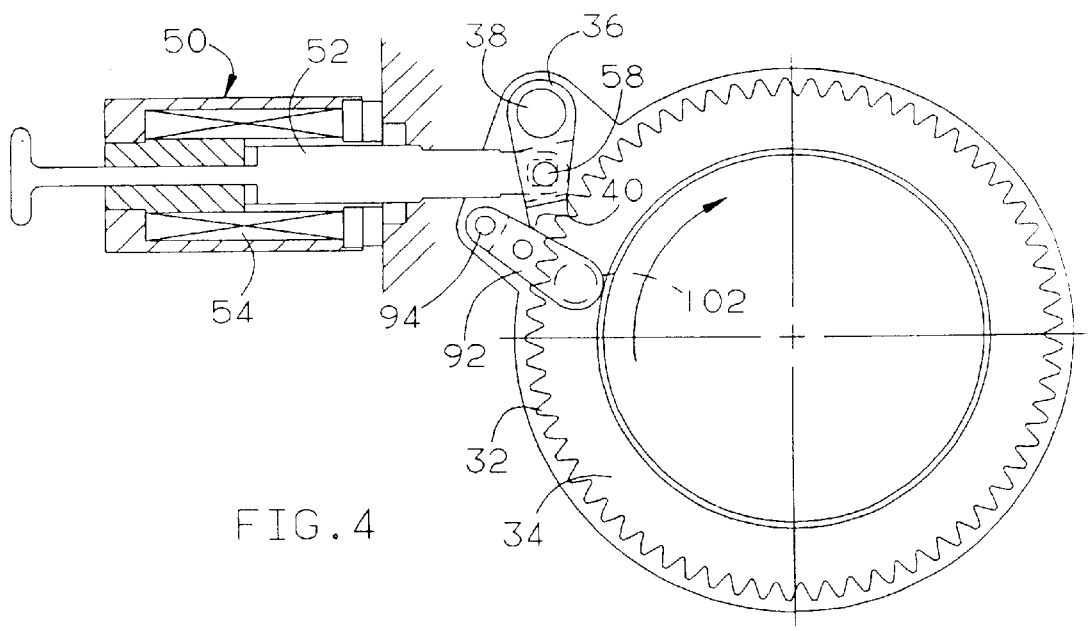
FIG. 4 is a view similar to FIGS. 2 and 3 but illustrating the configuration of the components when the aircraft spoiler has reached an aerodynamically neutral position.

The pivot pin 38 effectively mounts the pawl 36 for movement between extreme positions of movement illustrated in FIGS. 2 and 4. In FIG. 2, the pawl 36 is disengaged from the bull gear 34 whereas in FIG. 4, the pawl, and the tooth 40 thereof, is engaged with the piece 32 of the bull gear 34. FIG. 3 illustrates the configuration where the pawl 36 is engaging the bull gear 34 but is not blocking its movement because the same is rotating in a counterclockwise direction. In this case, the tooth 40 on the pawl 36 is simply literally bouncing along the teeth 32 as the bull gear 34 rotates in a counterclockwise direction.

The system includes an electrical actuator in the form of a solenoid, generally designated 50. The solenoid includes an armature 52 which is movable in and out of a winding or core 54, depending upon whether electrical current is flowing through the winding 54. Specifically, when power is flowing through the winding 54, the armature 52 will assume the position illustrated in FIG. 2 while when power is not flowing through the winding 54, the armature 52 may move to the positions illustrated in FIGS. 3 and 4.

One end 56 of the armature 52 is connected by a pivot pin 58 to the pawl 36 between the pivot pin 36 and tooth 40. As a consequence, it will be appreciated that when the armature 52 is retracted into the solenoid core 54 by reason of the latter being energized, the solenoid 50 will pull the pawl 36 to the position illustrated in FIG. 2 and out of engagement with the teeth 32 on the bull gear 34. Conversely, when the solenoid 50 is de-energized, by means of a biasing structure to be described hereinafter, the pawl 36 is biased towards the positions illustrated in FIGS. 3 and 4 whereat it may engage the teeth 32 of the bull gear 34.

Preferably, at its end remote from the pivot pin 58, the armature 52 includes a handle 60 whereby the armature 52 may be manually reciprocated for test and/or inspection purposes.

Figure 5:
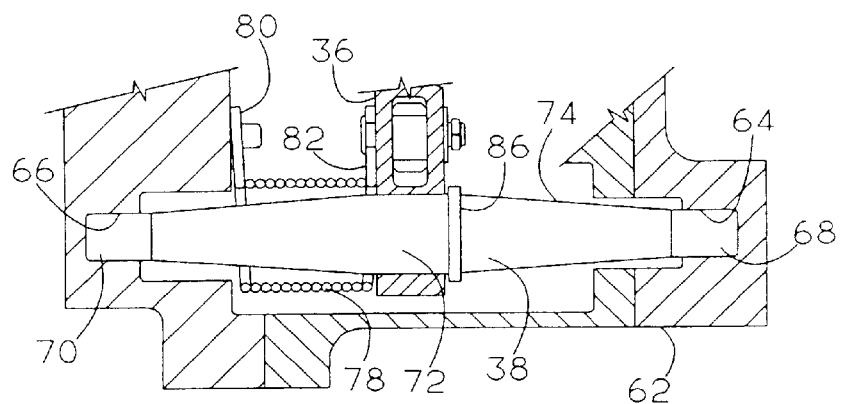
FIG. 5 is an enlarged, fragmentary elevation of a mounting structure for the pawl used in the mechanism.

Turning now to FIG. 5, part of the housing is shown somewhat fragmentarily at 62. The same includes a pair of bores 64 and 66 which receive respective, reduced diameter ends 68 and 70 of the pivot pin 38. As can be plainly seen in FIG. 5, the pivot pin 38 is elongated with the ends 68 and 70 being of reduced diameter in comparison to the center section 72 which journals the pawl 36. Between the center section 72 and the ends 68 and 70, the pin 38 is tapered as shown at 74.

A torsion coil spring 78 is located about the pin 38 and includes an end 80 fixed to the housing and an opposite end 82 fixed to the pawl 36. The arrangement is such as to bias the pawl 36 in a counterclockwise direction as viewed in FIGS. 2, 3 and 4. That is to say, the torsion coil spring 78 biases the pawl 36 towards an engaged position relative to the teeth 32 on the bull gear 34.

The pin 38 also includes a shoulder 86 on the side thereof opposite the torsion coil spring 78 so that the two operate to properly locate the pawl 36 in a desired position relative to the teeth 32 on the bull gear 34.

It is to be particularly noted that the pivot pin 38 is constructed in the previously described manner so as to allow the same to elastically deform when the pawl tooth 40 drops into engagement with the teeth 32 on the bull gear 34 as illustrated in FIG. 4. Such loading as may occur is then taken up in the deflection of the pivot pin 38 to prevent damage or breakage of the pawl tooth 40 or the teeth 32 on the bull gear 34.

Returning to FIG. 1, the invention also contemplates the provision of a motion sensor or detector for determining the direction of rotation of the system, i.e., whether it is moving the spoiler 10 toward the retracted or toward the extended position. This motion sensor is arranged to sense the motion of the bull gear 34 but those skilled in the art will recognize that it might be employed along with the pawl 36 at other locations in the system. It is, however, most preferable to locate such components so as to act on the bull gear 34 since it typically will be the slowest moving element in the system.

The motion sensor is generally designated 90 and includes a caliper-like structure 92 mounted to the housing by a pivot pin 94. The pivot axis of the caliper-like structure 92 as defined by the pivot pin 94 is parallel to that defined by the pivot pin 36 which in turn is parallel to the rotational axis 36 of the bull gear 34.

The caliper-like structure 92 includes a pair of spaced legs 96 and 98 which, as seen in FIG. 1, straddle the bull gear 34. The leg 96 includes a bore 100 in which is received a cup shaped friction pad 102 backed by a biasing spring 104 which biases the pad 102 out of the bore 100 toward the opposite leg 98. Thus, the pad 102 is biased into engagement with a side of the bull gear 34 to frictionally engage the same.

Also carried by the caliper-like structure 92, and extending between the legs 96 and 98 thereof, just radially outwardly of the teeth 32 of the bull gear 34, is a latch pin 106. The latch pin 106 can, as seen in FIG. 2, engage the latch to 42 on the pawl 36 to maintain the same out of engagement with the teeth 32 on the bull gear 34. However, if the caliper-like structure 92 is rotated to a position such as illustrated in FIGS. 3 or 4, the latch pin 106 is pulled out of engagement with the latch tooth 42 allowing the bias provided by the torsion coil spring 78 (FIG. 5) to pivot the pawl 36 in a counterclockwise direction about its pivot pin 38.

Figure 6:
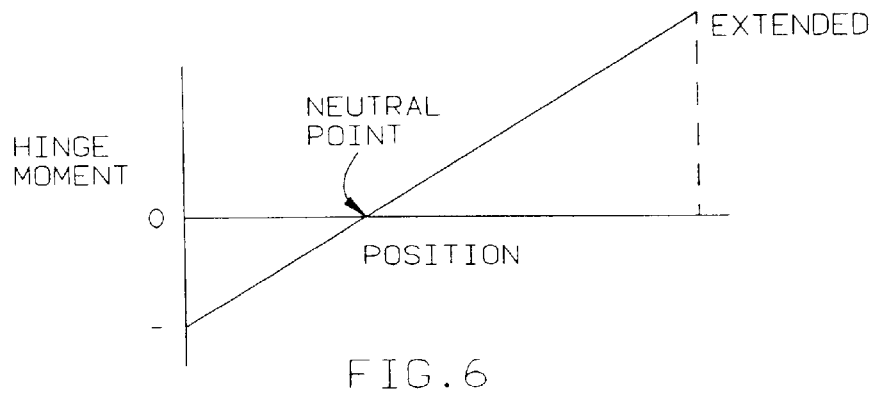
FIG. 6 is a graph illustrating the moment of the aircraft control surface at its hinge versus its position relative to extended and retracted positions.

FIG. 6 illustrates the moment applied to the hinge for any given position of the control surface. It will be seen that a negative moment is applied when the control surface is in a fully retracted position whereas a positive moment occurs when the control surface is fully extended. A neutral point, corresponding to the aerodynamic neutral point mentioned previously, provides a zero hinge moment. With this in mind, a description of the operation of the apparatus will be given.

Assuming that power for operating the system is available, and it is desired to extend the spoiler 10, the solenoid 50 will be energized to pull the pawl 36 out of engagement with the teeth 32 on the bull gear 34. At the same time, the motor 20 will be energized to drive the bull gear 34 in the clockwise direction, all as illustrated in FIG. 2.

Because of the frictional engagement of the pad 102 with the side of the bull gear 34, the resulting movement of the bull gear 34 by the motor 20 will cause caliper-like structure 92 to shift to the position illustrated in FIG. 2. At this point in time, the latch pin 106 will be brought into underlying engagement with the latch tooth 42 on the pawl 36, thereby maintaining the pawl 36 out of engagement with the bull gear 34. If the motor direction is reversed, but motor remains available, the caliper-like structure 94 may be pivoted in a clockwise direction to bring the latch pin 106 out of underlying engagement with the latch tooth 42 but the continued energization of the solenoid 50 will maintain the pawl 36 out of engagement with the teeth 32 on the bull gear 34.

In the event of a power failure, the solenoid 50 will be de-energized with the result that the torsion coil spring 78 (FIG. 5) will provide the sole biasing force on the pawl 36.

If the spoiler has already been retracted, this will have occurred accompanied by counterclockwise direction of the bull gear 34 such that the caliper-like structure will have shifted to the position illustrated in FIG. 3 such that the latch pin 106 cannot engage the latch tooth 42. As a consequence, the de-enerization of the solenoid will allow the torsion coil spring 78 to immediately bring the pawl tooth 40 into engagement with the teeth 32 on the bull gear 34 as shown in FIG. 4 to prevent any movement of the system that would result in partial or entire extension of the spoiler.

On the other hand, if the spoiler is partially or entirely extended at this time, the resulting air stream across the spoiler will tend to blow it down towards its neutral position. If the power failure occurred while the spoiler was in motion moving in the extend direction, latch pin 106 continues to hold pawl 36 out of engagement to prevent damaging inertia impact effects. The air stream across the spoiler reverses the motion of the spoiler from extension to retraction. This in turn will cause counterclockwise rotation of the bull gear 34. As the bull gear 34 moves with the spoiler as the spoiler moves towards its neutral position, the pawl tooth 40 will simply bounce along the teeth 32 on the bull gear 34 until the neutral position is reached. At this point in time, there will tend to be some inertial overshoot of the neutral position before the bull gear 34 comes to a halt. It then reverses its direction of rotation because of the overshoot so as to return to the neutral position. At this point in time, the tooth 40 on the pawl will drop into engagement with the teeth 32 of the bull gear 34 to halt movement of the bull gear 34 and maintain the same at or near a neutral position. It will be particularly observed that this occurs at a time when the inertial loading within the system is at a minimum so that the inertial forces that must be dissipated when the teeth 40 and 32 lock up is at a minimum. Nonetheless, by reason of the unique construction of the fin 38 mounting the pawl, such forces as may be present are immediately absorbed within the system without destruction or damage to any of the components.

A number of advantages accrue from the foregoing system including those alluded to previously. The system allows blow-down of a control surface, such as a spoiler, to a neutral position where it will not materially affect aircraft handling characteristics in the event of a power failure and then hold the control surface in such a neutral position. At the same time, a simple mechanical structure is offered. One particular advantage is the use of the already present gear teeth 32 on the bull gear as the teeth with which the pawl 36 coacts. Of course, if desired, a separate set of ratchet teeth on or connected to rotate with the bull gear 34 could be employed if desired.

I claim:

1. A blow-down mechanism for use with an aircraft control surface comprising:

a ball screw mechanism adapted to be connected to an aircraft control surface and including an input gear adapted for rotation about an axis;

an electrical motor having a rotary output;

at least one gear interconnecting said input gear and said rotary output;

a pawl mounted for movement between positions engaged with and disengaged from one of said input gear and said one gear;

means normally biasing said pawl toward said engaged position;

an electrical actuator operable to move said pawl against said biasing means toward said disengaged position;

a motion sensor associated with said one of said input gear and said one gear and for sensing the direction of rotation of said one of said input gear and said one gear;

a latch for holding said pawl in said disengaged position and responsive to said sensor for holding said pawl in said disengaged position for one direction of rotation of said one of said input gear and said one gear, and for releasing said pawl for the other direction of rotation of said one of said input gear and said one gear.

2. The blow-down mechanism of claim 1 wherein said pawl is mounted for movement between positions engaged with and disengaged from said input gear.

3. The blow-down mechanism of claim 2 wherein said pawl is pivotally mounted for movement between said positions.

4. The blow-down mechanism of claim 1 wherein said motion sensor includes a movable element frictionally engaging said one of said input gear and said one gear.

5. The blow-down mechanism of claim 4 wherein said element includes a friction pad and a spring for biasing said friction pad against said one of said input gear and said one gear.

6. The blow-down mechanism of claim 5 wherein said element includes a caliper-like structure having two legs straddling said one of said input gear and said one gear, and said friction pad is mounted on one of said legs and biased by said spring toward the other of said legs.

7. The blow-down mechanism of claim 6 wherein said latch includes a latch pin extending between said legs.

8. The blow-down mechanism of claim 1 wherein said electrical actuator includes a solenoid having an armature connected to said pawl.

9. A blow-down mechanism for use with an aircraft control surface comprising;

a ball screw mechanism adapted to be connected to an aircraft control surface and including an input adapted for rotation about an axis;

an electrical motor having a rotary output connected to said input for driving the same;

a toothed element connected to and rotatable with said input;

a pawl mounted for movement between positions engaged with and disengaged from said toothed element;

means normally biasing said pawl toward said engaged position;

an electrical actuator operable to move said pawl against said biasing means toward said disengaged position;

a motion sensor associated with said input for sensing the direction of rotation of said input; and a latch responsive to said sensor for holding said pawl in said disengaged position for one direction of rotation of said input, and for releasing said pawl for the other direction of rotation of said input.

10. The blow-down mechanism of claim 9 wherein said toothed element comprises gear teeth on said input.

11. The blow-down mechanism of claim 10 wherein said rotary output is connected to said gear teeth.

12. The blow-down mechanism of claim 10 wherein said motion sensor includes a movable lever mounting a friction pad in engagement with said input, and said latch includes a latch surface engageable with said pawl when said input is rotating in said one direction of rotation.

13. A blow-down mechanism for use with an aircraft control surface comprising;

a drive mechanism adapted to be connected to an aircraft control surface and including an input adapted for rotation about an axis;

an electrical motor having a rotary output connected to said input;

a toothed element mounted for rotation with said input;

a pawl mounted for movement between positions engaged with and disengaged from said toothed element;

an electrical actuator operable to move said pawl toward said disengaged position;

a movable motion sensor frictionally engaged with said input for sensing the direction of rotation of said input; and a latch carried by said motion sensor for holding said pawl in said disengaged position and responsive to movement of said sensor for holding said pawl in said disengaged position for one direction of rotation of said input and for releasing said pawl for the other direction of rotation of said input.

14. The blow-down mechanism of claim 13 wherein said motion sensor includes a leg adjacent said input and a friction pad carried by said leg and in engagement with said input.

* * * * *